(12) United States Patent
Chen et al.

(10) Patent No.: US 12,185,233 B2
(45) Date of Patent: Dec. 31, 2024

(54) METHOD, BASE STATION, CORE NETWORK FUNCTION AND RADIO ACCESS NETWORK NODE

(71) Applicant: NEC Corporation, Tokyo (JP)

(72) Inventors: Yuhua Chen, London (GB); Neeraj Gupta, London (GB); Jagdeep Ahluwalia Singh, Sutton (GB)

(73) Assignee: NEC CORPORATION, Tokyo (JP)

( * ) Notice: Subject to any disclaimer, the term of this patent is extended or adjusted under 35 U.S.C. 154(b) by 314 days.

(21) Appl. No.: 17/628,626

(22) PCT Filed: Oct. 2, 2020

(86) PCT No.: PCT/JP2020/037629
§ 371 (c)(1),
(2) Date: Jan. 20, 2022

(87) PCT Pub. No.: WO2021/066170
PCT Pub. Date: Apr. 8, 2021

(65) Prior Publication Data
US 2022/0256449 A1   Aug. 11, 2022

(30) Foreign Application Priority Data
Oct. 4, 2019   (GB) ..................................... 1914403

(51) Int. Cl.
*H04W 48/18*   (2009.01)
*H04W 12/06*   (2021.01)
*H04W 12/08*   (2021.01)
*H04W 48/08*   (2009.01)

(52) U.S. Cl.
CPC ........... *H04W 48/18* (2013.01); *H04W 12/06* (2013.01); *H04W 12/08* (2013.01); *H04W 48/08* (2013.01)

(58) Field of Classification Search
CPC ..... H04W 48/08; H04W 48/18; H04W 12/06; H04W 12/08
See application file for complete search history.

(56) References Cited

U.S. PATENT DOCUMENTS

2020/0314701 A1* 10/2020 Talebi Fard ...... H04W 36/0016

OTHER PUBLICATIONS

JP Office Action for JP Application No. 2022-501343, mailed on Dec. 13, 2022 with English Translation.
CMCC, "Public network integrated NPNs", 3GPP TSG RAN WG3 #105 R3-194408, Aug. 17, 2019, pp. 1-3.

(Continued)

*Primary Examiner* — Wayne H Cai
(74) *Attorney, Agent, or Firm* — Sughrue Mion, PLLC

(57) ABSTRACT

In one aspect, a method performed by a base station includes:
performing a Radio Resource Control (RRC) resume procedure for a user equipment (UE) in a cell of a non-public network; obtaining i) information identifying whether or not the UE is authorised to access the cell of a non-public network or ii) information identifying at least one non-public network that the UE is authorised to access, from another base station; verifying, based on the information of i) or ii), whether the UE is authorised to access the non-public network, wherein the information of i) or ii) is stored, in a UE context for the UE in the another base station in a process of a RRC setup for the UE in another cell of a network.

12 Claims, 9 Drawing Sheets

(56) References Cited

OTHER PUBLICATIONS

Japanese Office Communication for JP Application No. 2022-501343 mailed on Mar. 22, 2023 with English Translation.
NEC, "UE Allowed CAG List at the NG-RAN node", [online], 3GPP TSG RAN WG3 #106, R3-196946, Nov. 9, 2019.
International Search Report for PCT Application No. PCT/JP2020/037629, mailed on Dec. 14, 2020.
GB Office Action for GB Application No. 1914403.9, mailed on May 27, 2020.
R3-194413, Huawei et al., "General support of public network integrated NPN", 3GPP Draft, Aug. 17, 2019, pp. 1-5.
R2-1912361, Ericsson, "Further aspects of PNI NPN", 3GPP Draft, Oct. 3, 2019, pp. 1-9.
R3-193836, China Telecom et al., "CR for introducing Non Public Network in NG-RAN architecture", 3GPP Draft, Aug. 16, 2019, pp. 1-9.
NGMN, "NGMN 5G White Paper", V1.0, Feb. 17, 2015, pp. 1-125.
3GPP TS 22.261 V17.0.0, "Service requirements for the 5G system", Sep. 2019, pp. 1-82.
Japanese Office Communication for JP Application No. 2023-060935 mailed on Aug. 13, 2024 with English Translation.
Ericsson, NPN aspects for the Mobility Restriction List, 3GPP TSG RAN WG3 #105bis R3-195882, Oct. 4, 2019.

* cited by examiner

METHOD, BASE STATION, CORE NETWORK FUNCTION AND RADIO ACCESS NETWORK NODE

This application is a National Stage Entry of PCT/JP2020/037629 filed on Oct. 2, 2020, which claims priority from Great Britain Patent Application 1914403.9 filed on Oct. 4, 2019, the contents of all of which are incorporated herein by reference, in their entirety.

TECHNICAL FIELD

The present disclosure relates to mobile communications devices and networks.

BACKGROUND ART

The present disclosure relates to mobile communications devices and networks, particularly but not exclusively those operating according to the 3rd Generation Partnership Project (3GPP) standards or equivalents or derivatives thereof. The disclosure has particular although not exclusive relevance to mobility and verification for non-public networks in accordance with the so-called '5G' (or 'Next Generation') systems.

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G technologies are expected to enable network access to vertical markets and support network (RAN) sharing for offering networking services to third parties and for creating new business opportunities. 3GPP intends to support 5G by way of the so-called 3GPP Next Generation (NextGen) radio access network (RAN) and the 3GPP NextGen core (NGC) network. Various details of 5G networks and network slicing are described in, for example, the 'NGMN 5G White Paper' V1.0 by the Next Generation Mobile Networks (NGMN) Alliance, which document is available from https://www.ngmn.org/5g-white-paper.html.

The next-generation mobile networks must support diversified service requirements, which have been classified into three categories by the International Telecommunication Union (ITU): Enhanced Mobile Broadband (eMBB), Ultra-Reliable and Low-Latency Communications (uRLLC) and Massive Machine Type Communications (mMTC). eMBB aims to provide enhanced support of conventional MBB, with focuses on services requiring large and guaranteed bandwidth such as High Definition (HD) video, Virtual Reality (VR) and Augmented Reality (AR); uRLLC is a requirement for critical applications such as automated driving and factory automation, which require guaranteed access within a very short time; mMTC needs to support massive number of connected devices such as smart metering and environment monitoring but can usually tolerate certain access delay. It will be appreciated that some of these applications may have relatively lenient Quality of Service/Quality of Experience (QoS/QoE) requirements, while some applications may have relatively stringent QoS/QoE requirements (e.g. high bandwidth and/or low latency).

3GPP Technical Specification (TS) 22.261 V17.0.0 describes service requirements for the 5G system and introduces the concept of a so-called 'non-public network' (NPN). Section 6.25 of TS 22.261 describes that non-public networks are intended for the sole use of a private entity such as an enterprise, and may be deployed in a variety of configurations, utilising both virtual and physical elements. Specifically, they may be deployed as completely standalone networks, they may be hosted by a Public Land Mobile Network (PLMN), or they may be offered as a slice of a PLMN.

The main deployment scenarios and their characteristics currently being considered for non-public networks include:
1) Stand-alone Non-Public Network (SNPN), which refers to an NPN operated by an NPN operator and not relying on network functions provided by a PLMN:
    independent deployment and management from public PLMN; and
    uses its own network identifier (e.g. a unique PLMN identifier that is different to identifiers of other PLMNs);
2) Public network integrated NPN, which refers to a non-public network deployed with the support of a PLMN:
    integrated with a public PLMN (it may be a slice of a public network);
    shares the same PLMN identifier of the public network; and
    a Closed Access Group (CAG) identity is used to block non-NPN user access.

SUMMARY OF INVENTION

Technical Problem

In any of these deployment options, it is expected that unauthorised UEs, those that are not associated with the enterprise, will not attempt to access the non-public network, which could result in resources being used to reject that UE and thereby not be available for the UEs of the enterprise. It is also expected that UEs of the enterprise will not attempt to access a network they are not authorised to access. For example, some enterprise UEs may be restricted to only access the non-public network of the enterprise, even if PLMN coverage is available in the same geographic area. Other enterprise UEs may be able to access both a non-public network and a PLMN where specifically allowed.

A UE may be configured to support both a public network and a private network (or networks). The inventors have realised that when such a UE is in an inactive state and moves around, it is not clear how the UE needs to behave with respect to its associated NPN(s). For example, a UE that supports both a public network and at least one private network may take any of the following actions upon leaving/entering/re-entering an NPN: i) fall back to idle mode; ii) perform a notification area update every time when it crosses the border of NPN network coverage; and/or iii) perform CAG cell access verification every time when it enters or returns to NPN network coverage even if it just came out of the coverage very recently (e.g. a few seconds or minutes ago).

There is a need to provide appropriate RAN-based Notification Area (RNA) configuration, state management, and CAG verification in the above described deployment scenario seeking to minimise signalling overhead and management effort. Whilst these issues are more relevant to Public network integrated NPNs, they have relevance to certain SNPNs as well (e.g. those SNPNs that support mobility between SNPN(s) and public networks).

Accordingly, the present disclosure seeks to provide methods and associated apparatus that address or at least alleviate the above issues.

Although for efficiency of understanding for those of skill in the art, the disclosure will be described in detail in the context of a 3GPP system (5G networks), the principles of the disclosure can be applied to other systems in which slice scheduling is performed.

Solution to Problem

In one aspect, the disclosure provides a method performed by a base station, the method comprising: performing a Radio Resource Control (RRC) setup or RRC resume procedure for a user equipment (UE) in a cell of a non-public network; obtaining i) information identifying whether or not UE is authorised to access cell of a non-public network or ii) information identifying at least one non-public network that UE is authorised to access; verifying, based on said obtained information, whether UE is authorised to access that non-public network; and storing, in a UE context for UE, information identifying that UE is authorised to access that non-public network to which that cell belongs depending on a result of verification.

In one aspect, the disclosure provides a method performed by a core network function, the method comprising: receiving, from a base station, a signalling message including information identifying a non-public network that a user equipment (UE) is attempting to access; verifying, based on received information and based on membership/subscription information associated with UE, whether UE is authorised to access that non-public network; and providing a result of verification to base station for storing, by base station in a UE context for UE, information identifying whether UE is authorised to access that non-public network.

In one aspect, the disclosure provides a method performed by a core network function, the method comprising: providing, to a base station, information identifying at least one non-public network that a user equipment (UE) is a member of, for use by base station in verifying whether UE is authorised to access a non-public network associated with that base station or another base station.

In one aspect, the disclosure provides a base station comprising: means for performing a Radio Resource Control (RRC) setup or RRC resume procedure for a user equipment (UE) in a cell of a non-public network; means for obtaining i) information identifying whether or not UE is authorised to access cell of a non-public network or ii) information identifying at least one non-public network that UE is authorised to access; means for verifying, based on said obtained information, whether UE is authorised to access that non-public network; and means for storing, in a UE context for UE, information identifying that UE is authorised to access that non-public network to which that cell belongs depending on a result of verification.

In one aspect, the disclosure provides a core network function comprising: means for receiving, from a base station, a signalling message including information identifying a non-public network that a user equipment (UE) is attempting to access; means for verifying, based on received information and based on membership/subscription information associated with UE, whether UE is authorised to access that non-public network; and means for providing a result of verification to base station for storing, by base station in a UE context for UE, information identifying whether UE is authorised to access that non-public network.

In one aspect, the disclosure provides a core network function comprising: means for providing, to a base station, information identifying at least one non-public network that a user equipment (UE) is a member of, for use by base station in verifying whether UE is authorised to access a non-public network associated with that base station or another base station.

In one aspect, the disclosure provides a base station comprising a controller and a transceiver, wherein the controller is configured to: perform a Radio Resource Control (RRC) setup or RRC resume procedure for a user equipment (UE) in a cell of a non-public network; obtain i) information identifying whether or not UE is authorised to access cell of a non-public network or ii) information identifying at least one non-public network that UE is authorised to access; verify, based on obtained information, whether UE is authorised to access that non-public network; and store, in a UE context for said UE, information identifying that UE is authorised to access that non-public network to which that cell belongs depending on a result of verification.

In one aspect, the disclosure provides a core network function comprising a controller and a transceiver, wherein the controller is configured to: receive, from a base station, a signalling message including information identifying a non-public network that a user equipment (UE) is attempting to access; verify, based on received information and based on membership/subscription information associated with UE, whether UE is authorised to access that non-public network; and provide a result of verification to base station for storing, by base station in a UE context for UE, information identifying whether UE is authorised to access that non-public network.

In one aspect, the disclosure provides a core network function comprising a controller and a transceiver, wherein the controller is configured to: provide, to a base station, information identifying at least one non-public network that a user equipment (UE) is a member of, for use by base station in verifying whether UE is authorised to access a non-public network associated with that base station or another base station.

Aspects of the disclosure extend to corresponding systems, apparatus, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the disclosure independently of (or in combination with) any other disclosed and/or illustrated features. In particular but without limitation the features of any of the claims dependent from a particular independent claim may be introduced into that independent claim in any combination or individually.

Advantageous Effects of Invention

According to the present disclosure, it is possible to provide methods and associated apparatus that address or at least alleviate the above issues.

BRIEF DESCRIPTION OF DRAWINGS

Embodiments of the disclosure will now be described, by way of example, with reference to the accompanying drawings in which.

DESCRIPTION OF EMBODIMENTS

Overview

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect Internet-of-Things (IoT) devices and similar Machin-Type-Communication (MTC) devices to the network. For simplicity, the present application will use the term base station to refer to any such base stations and use the term mobile device or UE to refer to any such communication device.

Figure 1:
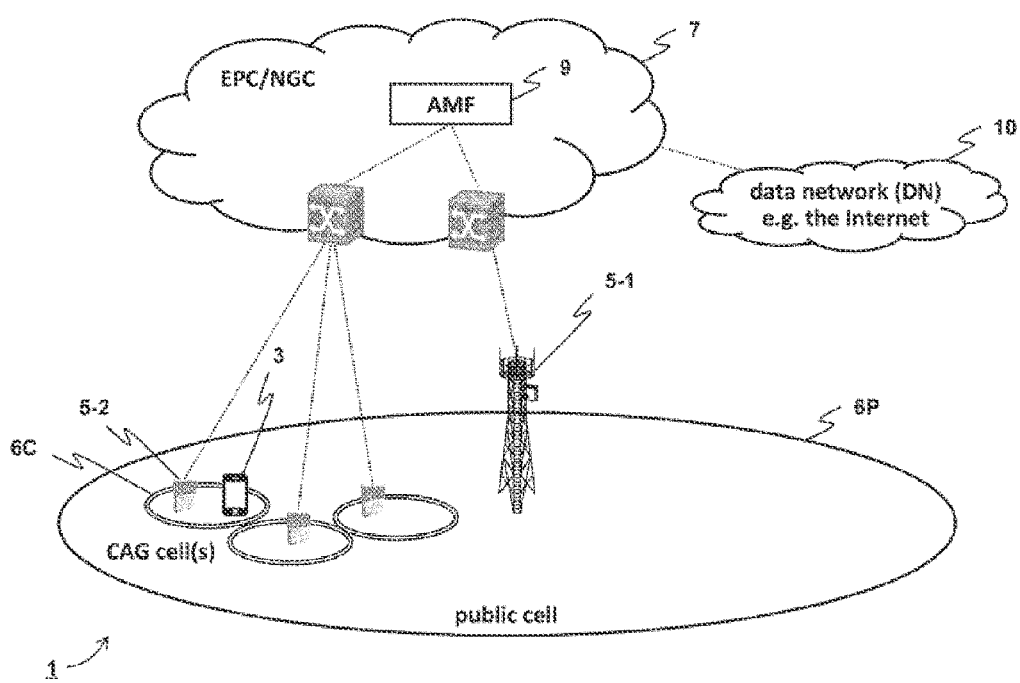
FIG. 1 illustrates schematically a mobile (cellular or wireless) telecommunication system to which embodiments of the disclosure may be applied.

FIG. 1 illustrates schematically a mobile (cellular or wireless) telecommunication system (network) 1 to which embodiments of the present disclosure may be applied. In this network 1, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. Each base station 5 controls one or more associated cells 6 (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G protocols, and/or any other 3GPP or non-3GPP communication protocols.

As can be seen, access to a public network (PLMN) is provided via a public base station 5-1 operating at least one public cell 6P (only one public cell 6P is shown in FIG. 1 for simplicity). Similarly, access to one or more non-public network (NPN) is provided via respective Closed Access Group (CAG) cells 6C and associated NPN base stations 5-2. It will be appreciated that a base station 5 may have both NPN base station and public base station functionality, in which case one or more CAG cell 6C and one or more public cell 6P may be provided via the same base station 5. As those skilled in the art will appreciate, whilst one mobile device 3 and four base stations 5 are shown in FIG. 1 for illustration purposes, the system, when implemented, will typically include other base stations and mobile devices (UEs).

Figure 2:
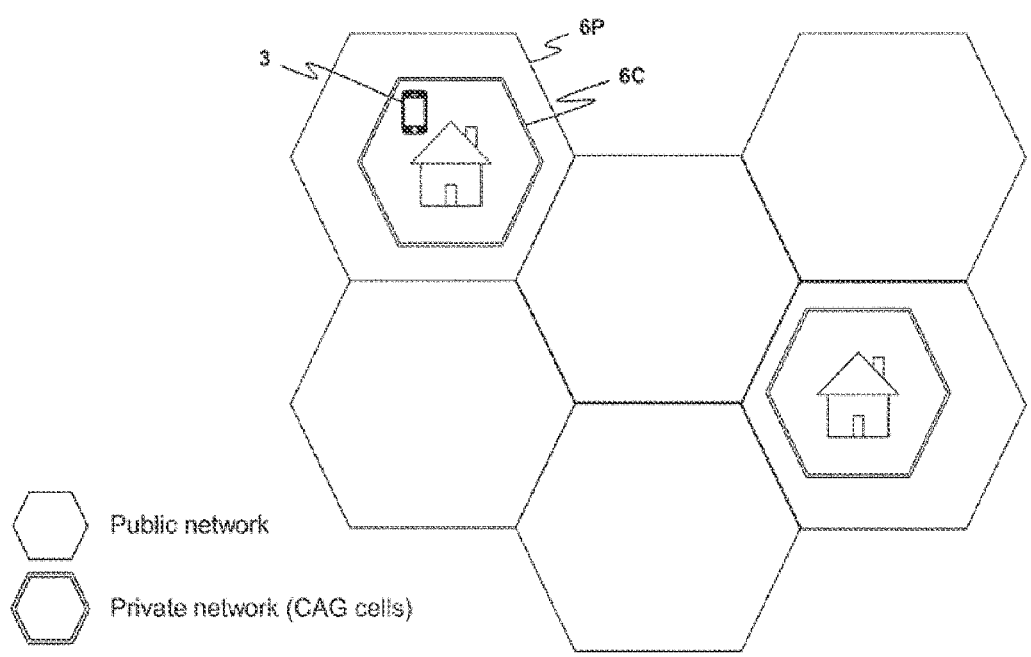
FIG. 2 illustrates schematically an exemplary network deployment having a mixture of public network cells and non-public (or private) cells.

FIG. 2 illustrates schematically another exemplary network deployment scenario in which both public network cells 6P and non-public/CAG cells 6C are provided. As can be seen, there are two private networks, each comprising at least one associated cell 6C. The CAG cells 6C overlap with the coverage area of the public network (PLMN). Although in this example the CAG cells 6C are located completely within a corresponding cell 6P of the public network, it will be appreciated that in other cases a CAG 6C may be partially overlapping with one or more other cell 6 (public and/or private) or may be provided completely outside the coverage of a public network. In this exemplary scenario, the mobile device 3 is located in an area where access to both types of network may be possible (depending on whether the mobile device 3 has appropriate access permissions/memberships).

Turning back to FIG. 1, the mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like). In this example, the public base station 5-1 and the NPN base station 5-2 are connected to the core network 7 via separate gateways although they may also be connected via the same gateway. In some deployment scenarios the public base station 5-1 and the NPN base station 5-2 will be connected to different core networks 7.

The core network 7 (e.g. the EPC in case of LTE or the NGC in case of NR/5G) typically includes logical nodes (or 'functions') for supporting communication in the telecommunication system 1, and for subscriber management, mobility management, charging, security, call/session management (amongst others). For example, the core network 7 of a 'Next Generation'/5G system will include, user plane entities and control plane entities. The user plane entities include, amongst others, user plane functions (UPFs) and control plane functions (CPFs). In this example, the control plane entities include, amongst others, an Access and Mobility Function (AMF) 9. Although not shown in FIG. 1, it will be appreciated that the core network 7 may also include one or more of the following: a Session Management Function (SMF), a Policy Control Function (PCF), an Operations and Maintenance (OAM) function, an Application Function (AF), an Authentication Server Function (AUSF), a Unified Data Management (UDM) entity, amongst others. The core network 7 is also coupled to a Data Network (DN) 10, such as the Internet or a similar Internet Protocol (IP) based network. Data communication between UEs 3 in a public cell 6P and UEs 3 in a CAG cell 6C may be routed via the DN 10 (e.g. when the NPN and the public network don't share the same core network 7).

Each mobile device 3 is configured with an appropriate RAN-based Notification Area (RNA) which in turn defines the procedures to be performed by the mobile device 3 whilst moving around the coverage area of the network. Such procedures include, although not limited to, location/routing/notification area updates, and/or the like.

The RNA configuration for a specific mobile device 3 supports a mix of CAG cells 6C and public cells 6P. In this system, RNA management is mainly dependent on the geographic location of the UE 3 and the number of necessary RNA updates is kept relatively low. In order to support such NPN/CAG cells 6C, and to minimise the number of RNA updates, the nodes of this network 1 are configured to perform one or more of the following options.

Option 1: CAG verification is performed in the core network 7 (for example, by the AMF 9). In this case, CAG verification is performed whenever a UE 3 initially accesses a PLMN/CAG cell 6C. The verified membership status is then stored (by the serving base station 5, the AMF 9, and/or another node) in the UE context associated with that UE 3, together with information identifying the relevant PLMN/CAG. When the UE 3 changes its cell 6 (e.g. due to mobility), the stored information on its membership status and PLMN/CAG is forwarded to the new (target) base station 5 when this new base station 5 retrieves the UE context. If the UE 3 is verified as member of another PLMN/CAG network, this verified membership status may be stored as well (for example, replacing or added to any previous verified membership status).

Option 2: CAG verification is performed at the base station 5 with assistance information from the core network 7 (e.g. from the AMF 9). In this case, the core network 7/AMF 9 provides, to the base station 5 performing CAG verification, the UE's CAG subscription information relevant to the selected PLMN (the PLMN of the base station 5). The base station 5 stores this subscription information in the UE context. The base station 5 takes the stored information into account when verifying the UE 3, whenever the UE 3 attempts to setup or resume its RRC connection via a CAG cell 6C (controlled by that base station 5 or a different base station 5). The base station 5 is configured to request this assistance information from the core network 7 (or another base station 5, if appropriate) when the base station 5 has a CAG cell 6C and/or a CAG neighbour cell).

Additionally, the assistance information may also be used to configure the RNA for the UE 3. Specifically, the base station 5 may configure a RNA with or without CAG neighbour cell (or with cells of one or more specific CAG), depending on the UE's relevant CAG subscription information.

Beneficially, the above described CAG verification methods make it possible for the UE 3 to stay in RRC inactivate state and move between the NPN and the public network without performing a RNA update. In other words, the above CAG verification allows seamless mobility whilst in RRC inactivate state, which in turn results in reduced signalling overhead and improved battery life of the UE 3. In a particularly beneficial case, UE membership verification for a PLMN/CAG only needs to be done once for the entire duration of the UE's ECM-Connected state.

User Equipment (UE)

Figure 3:
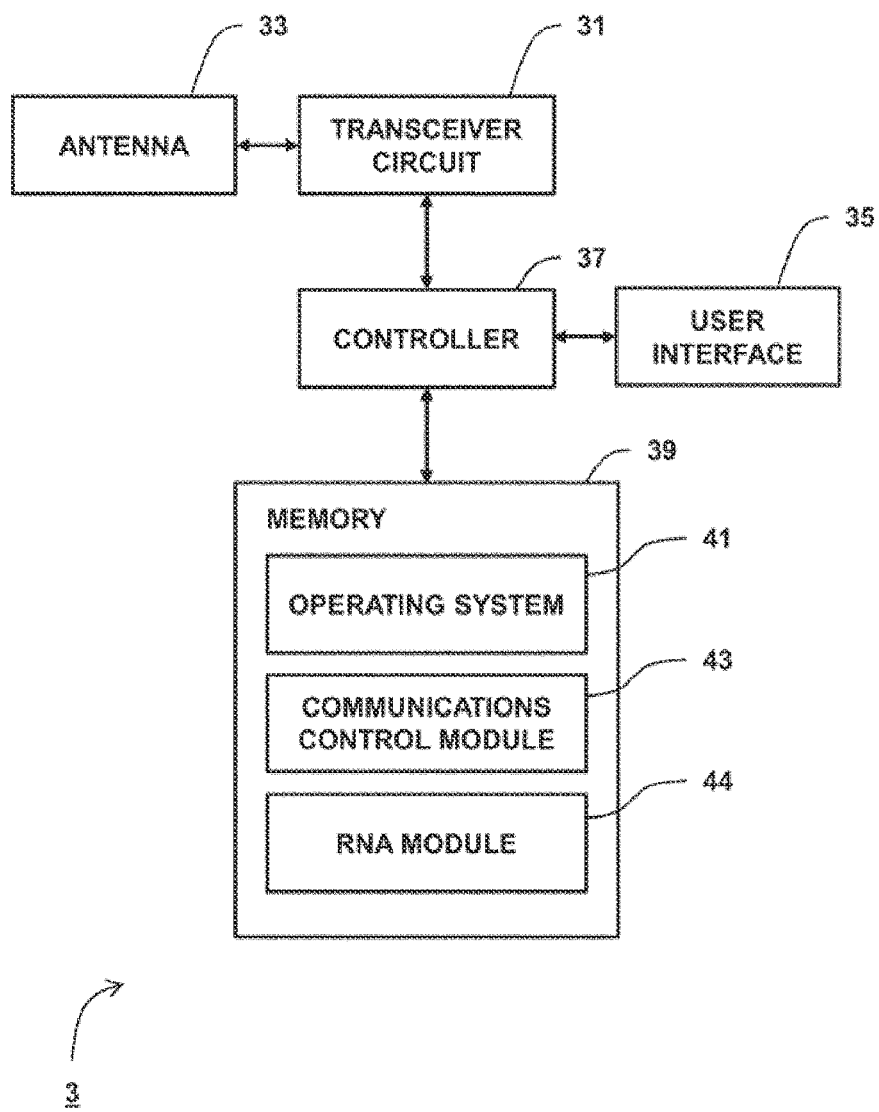
FIG. 3 is a schematic block diagram of a mobile device forming part of the system shown in FIG. 1.

FIG. 3 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 3, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, a communications control module 43, and a RNA module 44.

The communications control module 43 is responsible for handling (generating/sending/receiving) signalling messages and uplink/downlink data packets between the UE 3 and other nodes, including (R)AN nodes 5 and core network nodes. The signalling may comprise signalling related to RAN-based Notification Area update and provision of information relating to the UE's CAG membership.

The RNA module 44 is responsible for performing RNA update (when appropriate) taking into account the current geographic location (on a cell level) and any CAG membership of the UE 3, based on an appropriate RNA configuration provided by the UE's serving base station 5.

Access Network Node (Base Station)

Figure 4:
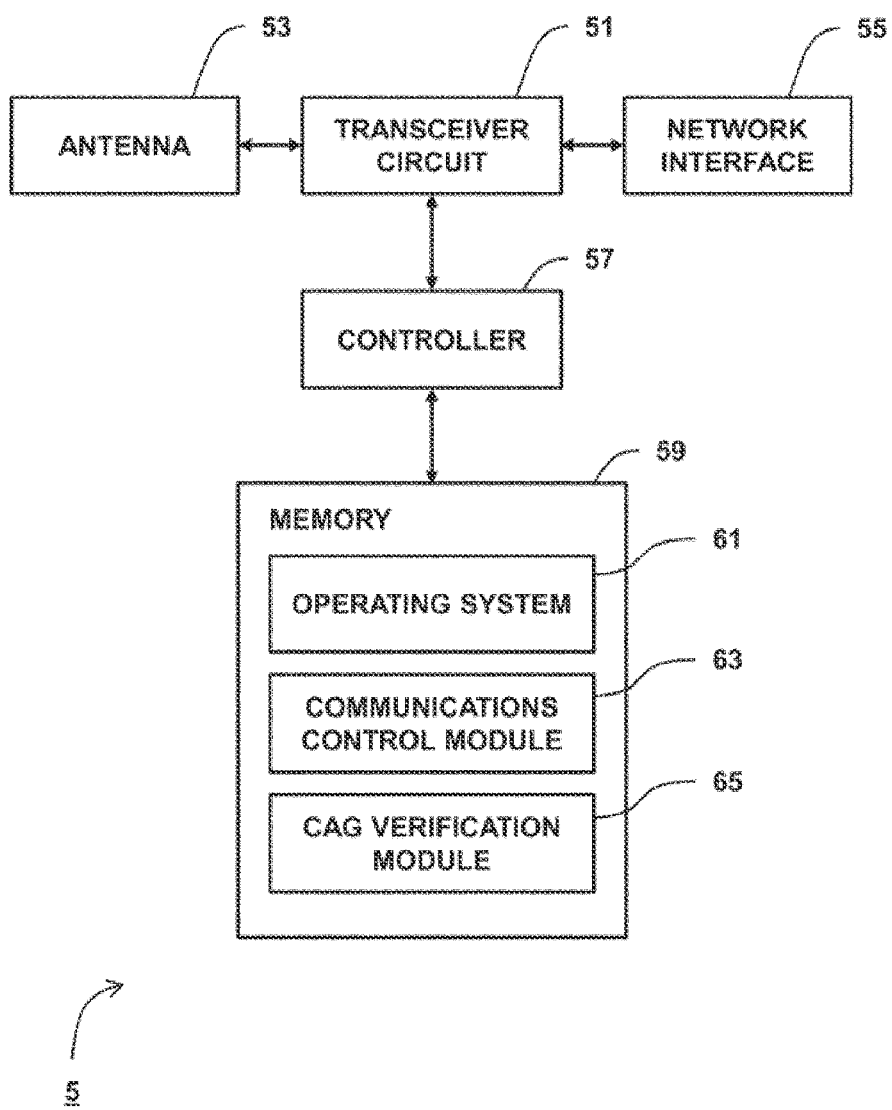
FIG. 4 is a schematic block diagram of an access network node (e.g. base station) forming part of the system shown in FIG. 1.

FIG. 4 is a block diagram illustrating the main components of the base station 5 (or a similar access network node) shown in FIG. 1. As shown, the base station 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, a communications control module 63, and a CAG verification module 65.

When control plane—user plane (CP-UP) split is employed, the base station 5 may be split into separate control-plane and user-plane entities, each of which may include an associated transceiver circuit 51, antenna 53, network interface 55, controller 57, memory 59, operating system 61, and communications control module 63 (amongst others). When the base station 5 comprises a distributed base station, the network interface 55 also includes an E1 interface and an F1 interface (F1-C for the control plane and F1-U for the user plane) to communicate signals between respective functions of the distributed base station.

The communications control module 63 is responsible for handling (generating/sending/receiving) signalling between the base station 5 and other nodes, such as the UE 3 and the core network nodes. The signalling may comprise signalling related to RAN-based Notification Area update (involving the UE 3) and exchanging information relating to the UE's CAG membership with other base stations 5 and/or core network nodes (e.g. the AMF 12). For example, the communications control module 63 is responsible for providing an appropriate RNA configuration to UEs 3 served by the base station 5. The communications control module 63 holds an associated UE context for each UE 3 served by this base station 5 and provides the UE context to other base stations when appropriate (e.g. upon request). When CP-UP split is employed, the communications control module 63 is also responsible for communications (generating, sending, and receiving signalling messages) between the control-plane and user-plane parts of the base station 5.

The CAG verification module 65 is responsible for performing (at least a part of) CAG verification for UEs trying to access any CAG cell 6C managed by the base station. CAG verification may be performed in accordance with option 1 and/or option 2 (as illustrated in FIGS. 6 to 9) depending on configuration or depending on the core network's judgement regarding whether the base station is secure enough to hold end user's subscription information.

Core Network Function

Figure 5:
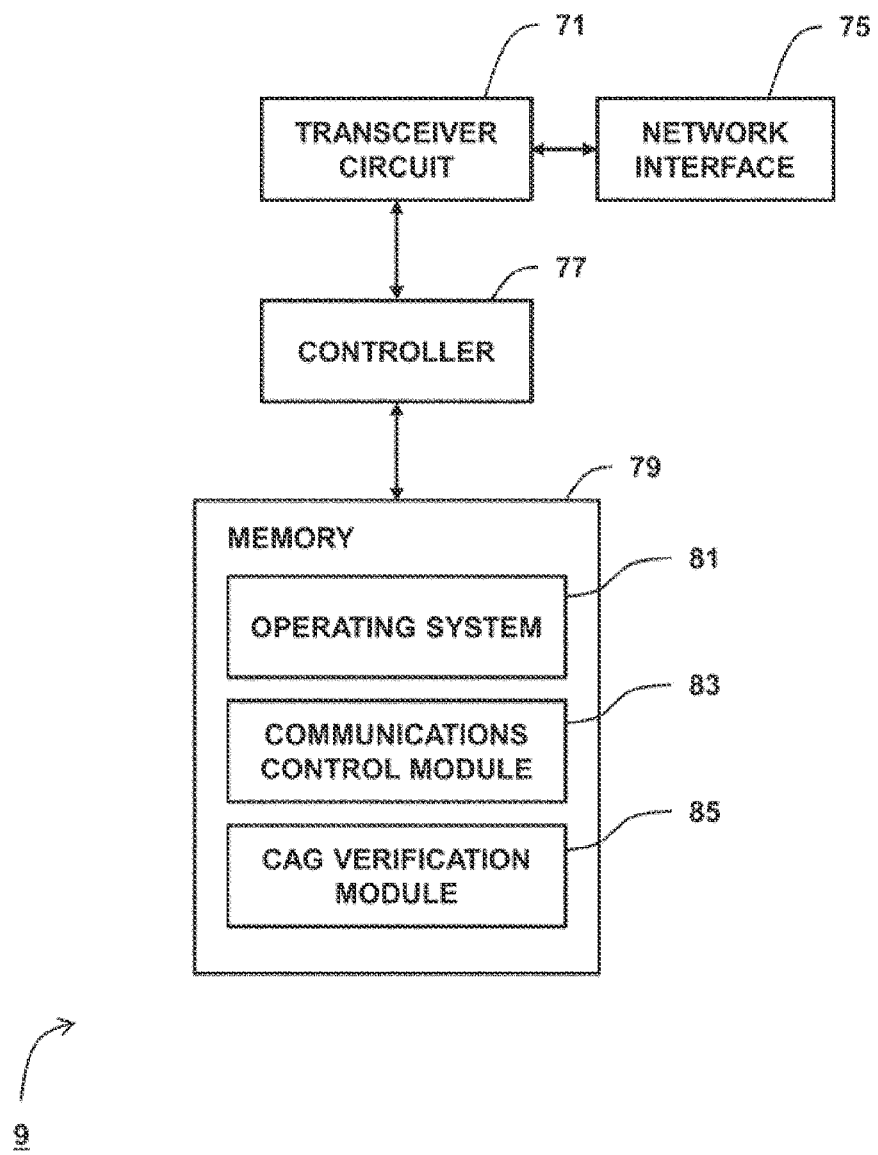
FIG. 5 is a schematic block diagram of a core network node forming part of the system shown in FIG. 1.

FIG. 5 is a block diagram illustrating the main components of a generic core network function, such as the AMF 12 shown in FIG. 1. As shown, the core network function includes a transceiver circuit 71 which is operable to transmit signals to and to receive signals from other nodes (including the UE 3, the base station 5, and other core network nodes) via a network interface 75. A controller 77 controls the operation of the core network function in accordance with software stored in a memory 79. The software may be pre-installed in the memory 79 and/or may be downloaded via the telecommunication network 1 or from a removable data storage device (RMD), for example. The software includes, among other things, an operating system 81, a communications control module 83, and a CAG verification module 85.

The communications control module 83 is responsible for handling (generating/sending/receiving) signalling between the core network function and other nodes, such as the UE 3, the base station 5, and other core network nodes. The signalling may comprise signalling related to RAN-based Notification Area update (involving the UE 3) and exchanging information relating to the UE's CAG membership with the base stations 5 and/or other core network nodes.

The CAG verification module 85 is responsible for performing (at least a part of) CAG verification for UEs trying to access any CAG cell 6C managed by the core network node (AMF 12). CAG verification may be performed in accordance with option 1 and/or option 2 (as illustrated in FIGS. 6 to 9) depending on configuration.

DETAILED DESCRIPTION

Figure 6:
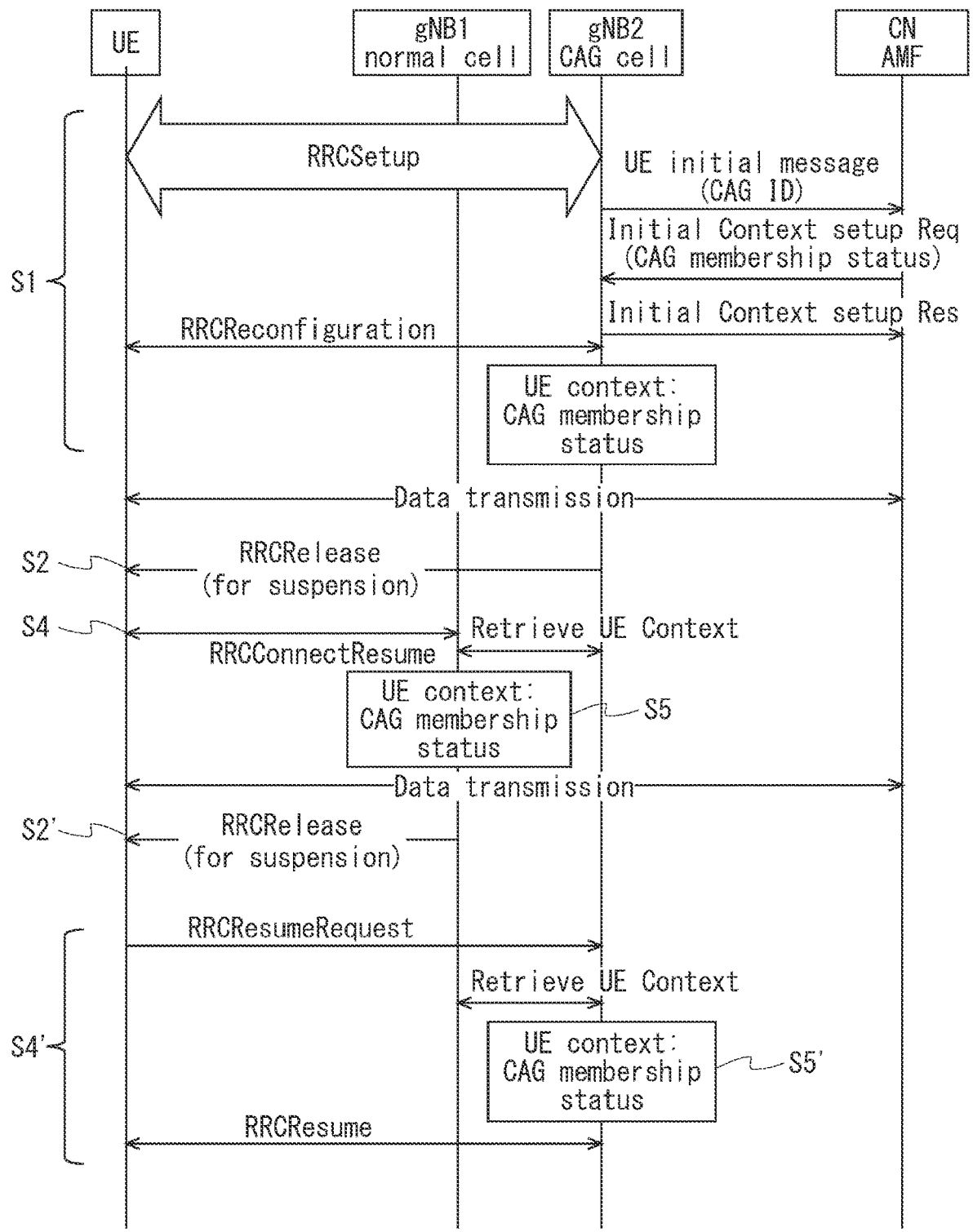
FIG. 6 illustrates schematically an exemplary way in which CAG verification may be performed in the system shown in FIG. 1.
Figure 7:
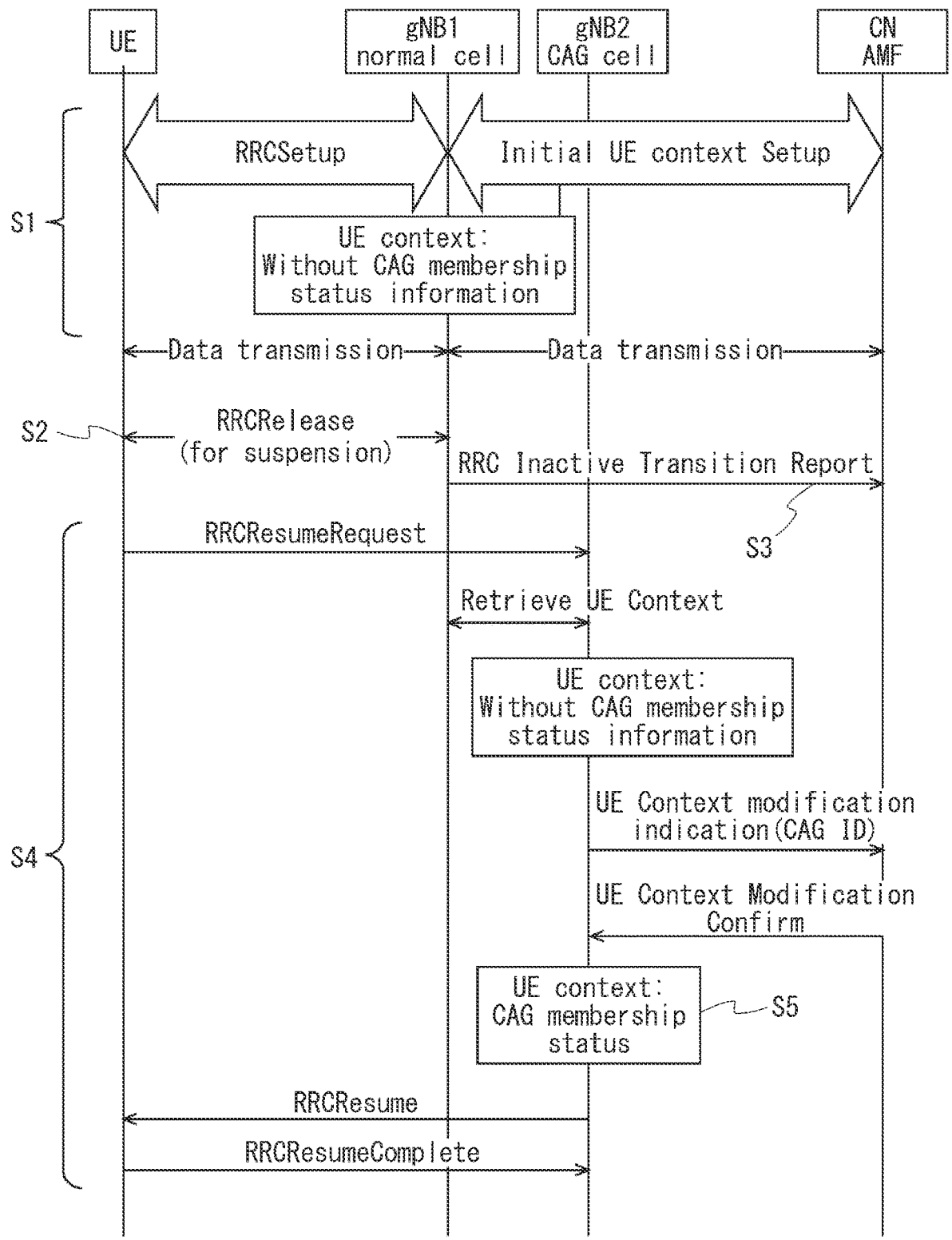
FIG. 7 illustrates schematically an exemplary way in which CAG verification may be performed in the system shown in FIG. 1.
Figure 8:
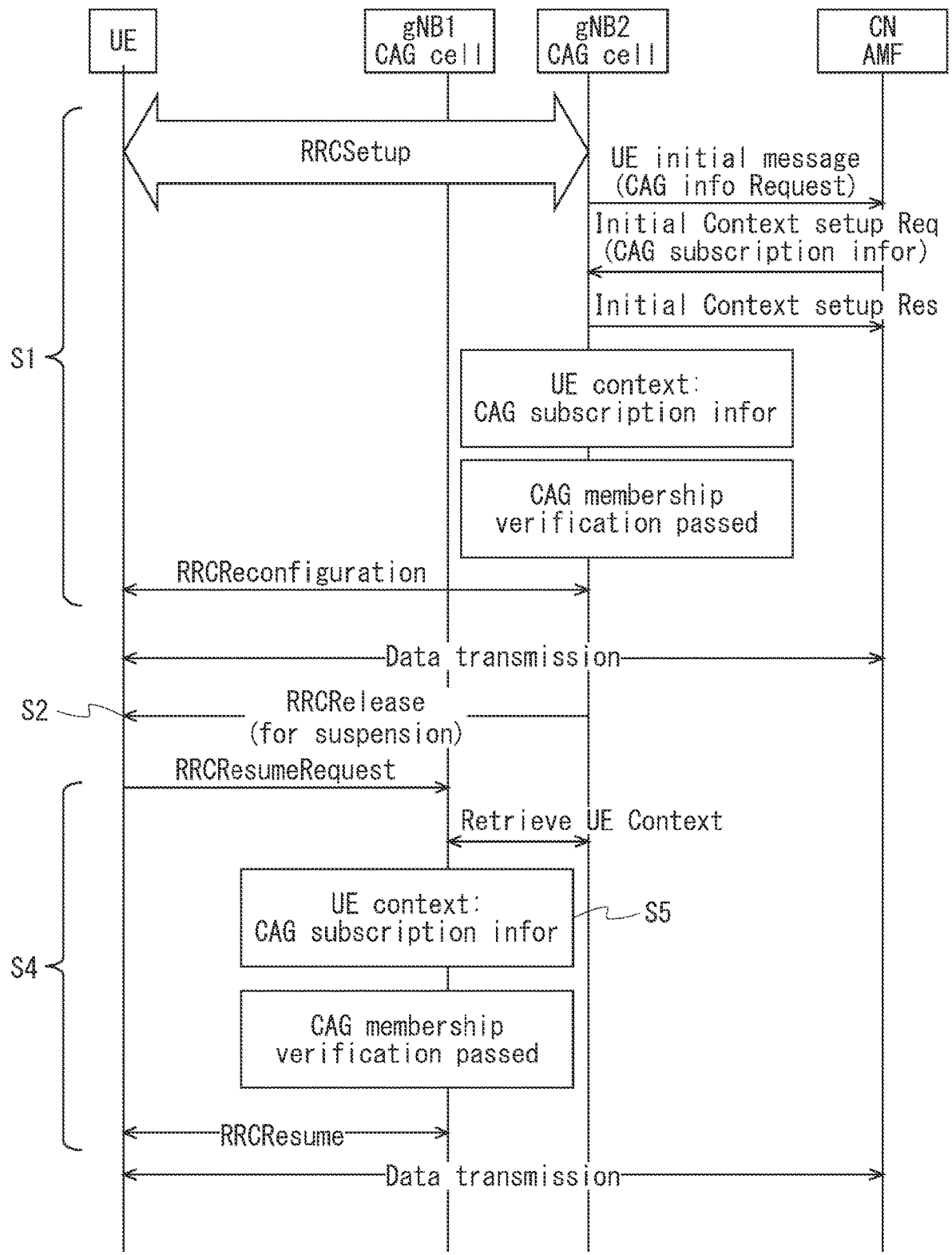
FIG. 8 illustrates schematically an exemplary way in which CAG verification may be performed in the system shown in FIG. 1.
Figure 9:
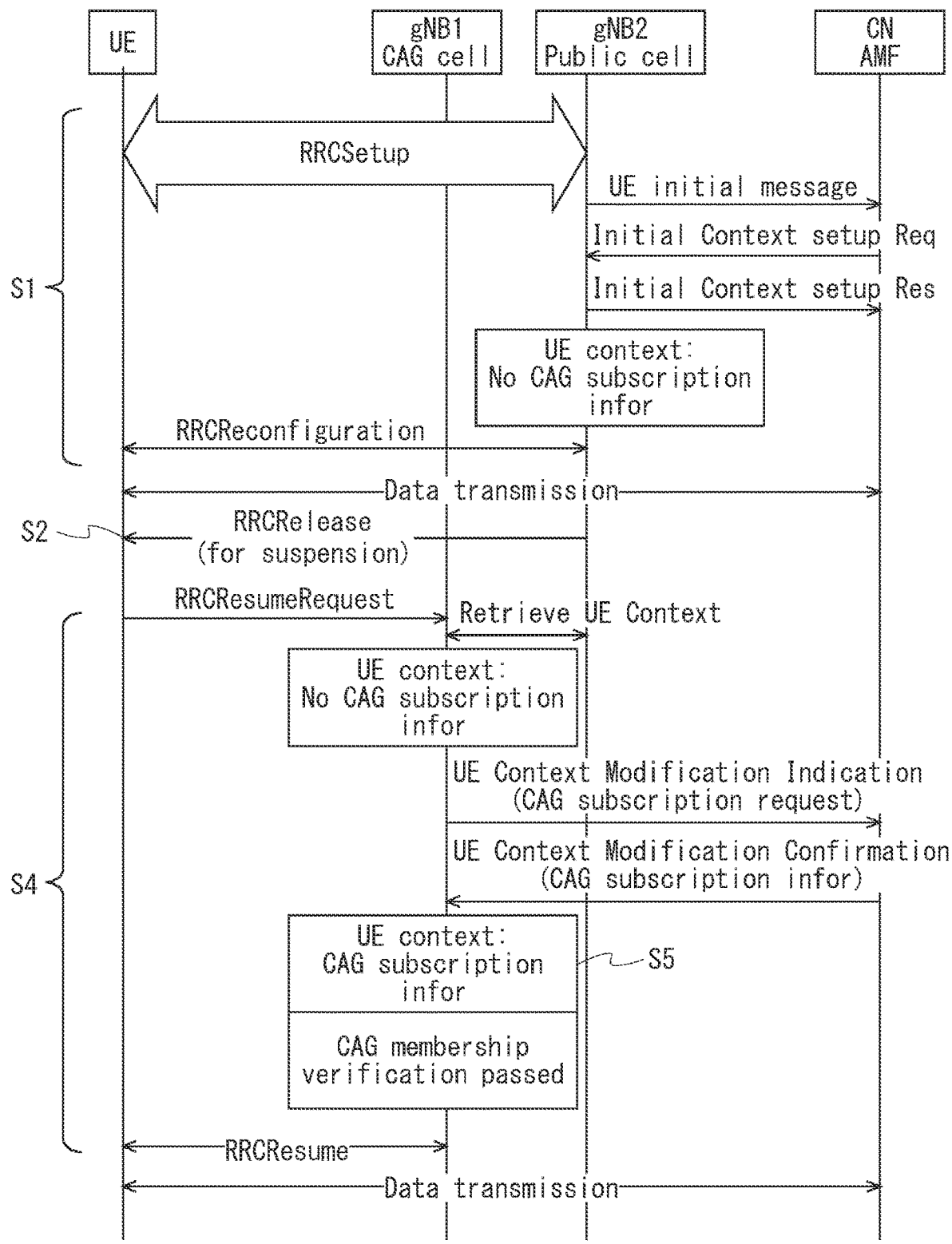
FIG. 9 illustrates schematically an exemplary way in which CAG verification may be performed in the system shown in FIG. 1.

A more detailed description of some exemplary embodiments is provided below with reference to FIGS. 6 to 9, where FIGS. 6 and 7 illustrate two different scenarios in accordance with a first option, and FIGS. 8 and 9 illustrate two different scenarios in accordance with a second option. In each option, the RNA configuration for a specific mobile device 3 supports a mix of CAG cells 6C and public cells 6P.

Option 1—Overview

In this case CAG verification is performed by the AMF 9 (using its CAG verification module 85). Specifically, CAG verification is performed as part of the UE's 3 initial access to a PLMN/CAG cell 6C. The verified membership status is then stored (by the serving base station 5, the AMF 9, and/or another node) in the UE context associated with that UE 3, together with information identifying the relevant PLMN/CAG. When the UE 3 changes its cell 6 (e.g. due to mobility), the stored information on its membership status and PLMN/CAG is forwarded to the new (target) base station 5 when the new base station 5 retrieves the UE context. If the UE 3 is verified as member of another PLMN/CAG network, this verified membership status may be stored as well.

Option 1—Scenario 1

This exemplary scenario is illustrated in FIG. 6, and includes the following steps:

Step S1: The UE 3 initially accesses a CAG cell 6C having an associated PLMN/CAG ID (using it communications control module 43 and performing an appropriate RRC setup procedure via the base station 5-2 operating that initial cell 6C). As part of this initial access, the UE 3 transmits an appropriately formatted Non-Access Stratum (NAS) Protocol Data Unit (PDU) 'UE initial message' towards the AMF 9. In this example, the base station forwards the UE's message to the AMF and also includes the CAG ID that corresponds to the CAG ID associated with the initial cell 6C. The base station 5-2 then obtains CAG membership state information (CAG verification information) indicating whether or not the UE 3 is member of the indicated CAG and authorised to use the NPN associated with the CAG to which the initial cell 6C belongs. If the information obtained from the core network 7/AMF 9 indicates that the UE 3 is not authorised to use that cell 6C, then the base station 5-2 rejects the UE's attempt to access the cell 6C. However, if the information obtained from the core network 7/AMF 9 indicates that the UE 3 is authorised to use that cell 6C, then the base station 5-2 and the UE 3 perform an appropriate RRC (re)configuration procedure. After RRC configuration the UE 3 is able to transmit data towards the core network 7 via the CAG cell 6C. The serving base station 5-1 indicates in the UE context for the UE 3 that the UE 3 has been authorised to use the CAG/NPN associated with the initial cell 6C.

Step S2: When the RRC connection is suspended, the UE 3 enters RRC inactive state (e.g. when it has no more data to send/receive). RRC suspension typically involves appropriate signalling (and/or a timer) between the network and the UE 3 so that the serving base station 5-1 knows when the UE 3 has entered the RRC inactive state. The serving base station 5-1 stores the UE context for the inactive UE 3 so that the RRC connection can be resumed when appropriate (when there is more data for the UE 3 to send/receive).

It will be appreciated that the UE 3 may subsequently resume its suspended RRC connection either via a public cell 6P or via a CAG cell having the same associated PLMN/CAG ID as the cell that the UE 3 has previously accessed (e.g. the cell 6C in which the RRC connection was suspended).

Step S4: If the UE 3 resumes its RRC connection via a public cell 6P, then the base station 5-1 serving this cell 6P retrieves the UE context (including any CAG membership status stored therein) from the base station 5-2 where the RRC connection was suspended. Since the new cell 6P does not belong to any CAG (or may be accessible to all CAGs) the new base station 5-1 does not need to perform CAG verification (although it may still need to perform other access authorisation procedures). However, the base station 5-1 stores the UE's CAG membership status with the UE context (for later use). After successful RRC resumption the UE 3 is able to transmit data towards the core network 7 via the CAG cell 6C.

Step S2': In this example, the RRC connection is suspended again and the UE 3 enters RRC inactive state.

Step S4': If the UE 3 resumes its RRC connection via a CAG cell 6C having an associated PLMN/CAG ID, then the base station 5-2 operating that cell 6C needs to perform CAG verification. In order to do so, the new base station 5-2 retrieves the UE context from the base station 5 where the RRC connection was suspended (in this example, the public base station 5-1). Since the UE 3 has already accessed a CAG cell 6C with the same associated PLMN/CAG ID as the new cell and this is indicated by the UE context, there is no need to involve the core network 7/AMF 9 when performing CAG verification for this UE 3. In other words, the base station 5-2 serving the new CAG cell 6C is configured to perform CAG verification based on the information included in the UE context from the previous base station 5-1 operating the cell 6P where the RRC connection was suspended (even though that cell 6P did not belong to the same CAG/PLMN as the new base station 5-2). Accordingly, the UE 3 is able to communicate via the new CAG cell 6C using its resumed RRC connection.

Option 1—Scenario 2

This exemplary scenario is illustrated in FIG. 7, and includes the following steps:

Step S1: The UE 3 initially accesses a public cell 6P (using it communications control module 43 and performing an appropriate RRC setup procedure via the base station 5-1 operating that cell 6P). In response to this, the base station 5-1 operating the public cell 6P performs an initial UE context setup with the AMF 9 and creates a UE context for the UE 3 (to be stored by the base station's communications control module 63). As can be seen in FIG. 7, the UE context initially does not include CAG membership information since the cell 6P used for initial access is a public cell. The UE 3 is now able to communicate with the core network 7 (and other nodes beyond the core network 7) via the public cell 6P.

Step S2: When the RRC connection is suspended, the UE 3 enters RRC inactive state (e.g. when it has no more data to send/receive). The serving base station 5-1 keeps the UE context for the inactive UE 3 so that the RRC connection can be resumed when appropriate (when there is new data for the UE 3 to send/receive). The serving base station 5-1 also notifies the AMF 9 that the UE's RRC connection has been suspended. In this case the serving base station 5-1 notifies the AMF 9 by generating and sending an appropriately formatted 'RRC Inactive Transition Report' and/or the like (step S3).

Step S4: In this scenario, the UE 3 resumes its suspended RRC connection via a CAG cell 6C having an associated PLMN/CAG ID. The base station 5-2 serving this cell 6C retrieves the UE context from the base station 5-1 that suspended the RRC connection. Since this is the first time that the UE 3 accesses a CAG cell (since initial setup of this RRC connection) the UE context retrieved from the previous base station 5-1 does not indicate any CAG membership (alternatively, if the UE 3 has accessed another CAG cell corresponding to a different PLMN/CAG ID, the UE context indicates a different PLMN/CAG ID rather than the one for this cell 6C). Accordingly, the new base station 5-2 proceeds to obtain (or update) CAG information associated with the UE 3 from the core network 7/AMF 9. In this example, the base station 5-2 generates and sends and appropriately formatted request for CAG information associated with the UE 3 (e.g. a 'UE Context Modification Indication' message and/or the like, and in this case the message includes the PLMN/CAG ID associated with the cell of the new base station 5-2). The core network 7/AMF 9 provides assistance information regarding the CAG ID in an appropriately formatted response (e.g. a 'UE Context Modification Confirmation' message and/or the like). Effectively, the assistance information indicates to the new base station 5-2 that the UE 3 has appropriate membership for the PLMN/CAG ID associated with the new cell 6C. It will be appreciated that the assistance information may also indicate a number of additional CAG memberships for the UE 3, if appropriate. The request and the response may comprise one or more appropriately formatted information elements (IEs), such as a 'CAG information' IE, a 'CAG subscription request' IE, a 'CAG subscription information' IE, 'CAG ID' IE, a 'PLMN ID' IE, and/or the like.

Step S5: The new base station 5-2 saves the CAG information associated with the UE 3 in the UE context and resumes the RRC connection via the new cell 6C.

Option 2—Overview

In this case CAG verification is performed at the base station 5 using assistance information from the core network 7 (e.g. from the AMF 9). Specifically, the core network 7/AMF 9 provides, to the base station 5 performing CAG verification, the whole UE's CAG subscription information, or a subset of the UE's CAG subscription information, i.e. information relevant only to the selected PLMN (the PLMN of the base station 5). The base station 5 stores this subscription information in the UE context. The base station 5 takes the stored information into account when verifying the UE 3, whenever the UE 3 attempts to setup or resume its RRC connection via a CAG cell 6C (controlled by that base station 5 or a base station 5 serving the same CAG). The base station 5 is configured to request this assistance information from the core network 7 (or another base station 5, if appropriate) when the base station 5 has a CAG cell 6C and/or a CAG neighbour cell) and if UE context is available but without CAG subscription information. The core network 7/AMF 9 decides whether it will provide the base station the CAG subscription information to the base station (as in option 2) or only give the CAG membership state associated with the PLMN/CAG of the serving cell 6C (e.g. depending on the judgement regarding whether that base station is secure enough to hold end user's subscription information—effectively as in option 1).

Option 2—Scenario 1

This exemplary scenario is illustrated in FIG. 8, and includes the following steps:

Step S1: The UE 3 initially accesses a CAG cell 6C having an associated PLMN/CAG ID (using it communications control module 43 and performing an appropriate RRC setup procedure via the base station 5-2 operating that initial cell 6C). As part of this initial access, the UE 3 transmits an appropriately formatted 'UE initial message' towards the AMF 9. The base station 5-2 forwards the UE's message to the AMF 9 and obtains CAG information associated with the UE 3 in order to perform CAG verification (i.e. to verify that the UE 3 is authorised to use cells the NPN associated with the CAG to which the initial cell 6C belongs). If the information obtained from the core network 7/AMF 9 indicates that the UE 3 belongs to a CAG that matches the CAG associated with the initial cell 6C, then the UE 3 is allowed to access that NPN and the base station 5-2 and UE 3 perform an appropriate RRC (re)configuration procedure. Following successful CAG verification and RRC configuration, the UE 3 is able to transmit data towards the core network 7 via the CAG cell 6C. If the information obtained from the core network 7/AMF 9 indicates that the UE 3 does not belong to any CAG/NPN that matches the CAG (or at least one of the CAGs, if more than one) associated with the initial cell 6C, then the UE 3 is not allowed to access that NPN.

Step S2: When the RRC connection is suspended, the UE 3 enters RRC inactive state (e.g. when it has no more data to send/receive).

Step S4: The RRC connection is resumed at a different CAG cell 6C with the same PLMN/CAG ID as the initial cell. Thus, there is no need to involve the core network 7/AMF 9 when performing CAG verification for this UE 3 in order to access this new cell 6C. In other words, the base station 5-2 serving the new CAG cell 6C is configured to perform CAG verification based on the information included in the UE context retrieved from the base station 5-2 serving the former CAG cell 6C. As shown in FIG. 8, data is now transmitted between the UE 3 and the core network 7 via the new CAG cell 6C.

Option 2—Scenario 2

This exemplary scenario is illustrated in FIG. 9, and includes the following steps:

Step S1: The UE 3 initially accesses a public cell 6P (using it communications control module 43 and performing an appropriate RRC setup procedure via the base station 5-1 operating that cell 6P). As part of this initial access, the UE 3 transmits an appropriately formatted 'UE initial message' towards the AMF 9 (via the base station 5-1). The base station 5-1 forwards the UE's message to the AMF 9 and creates a UE context for the UE 3 (to be stored by the base station's communications control module 63). As can be seen in FIG. 9, at this point the UE context does not include CAG subscription information since the cell 6P used for initial access is a public cell. Following successful RRC (re)configuration, the UE 3 is able to communicate with the core network 7 (and other nodes beyond the core network 7) via the public cell 6P.

Step S2: When the RRC connection is suspended, the UE 3 enters RRC inactive state (e.g. when it has no more data to send/receive). The serving base station 5-1 keeps the UE context for the inactive UE 3 so that the RRC connection can be resumed when appropriate (when there is new data for the UE 3 to send/receive).

Step S4: In this scenario, the UE 3 resumes its suspended RRC connection via a CAG cell 6C having an associated PLMN/CAG ID. The base station 5-2 serving this cell 6C retrieves the UE context from the base station 5-1 where the RRC connection was suspended. Since the UE 3 has not previously accessed a CAG cell (since setting up its current RRC connection), the new base station 5-2 obtains CAG information associated with the UE 3 from the core network 7/AMF 9. In this example, the base station 5-2 generates and sends and appropriately formatted request for CAG information associated with the UE 3 (e.g. a 'UE Context Modification Indication' message and/or the like). The core network 7/AMF 9 provides the requested CAG information in an appropriately formatted response (e.g. a 'UE Context Modification Confirmation' message and/or the like). The CAG information may comprise information identifying at least one PLMN/CAG that the UE 3 is member of (e.g. a list of PLMN/CAG IDs). It will be appreciated that the request and the response may comprise one or more appropriately formatted information elements (IEs), such as a 'CAG information' IE, a 'CAG subscription request' IE, a 'CAG subscription information' IE, 'CAG ID' IE, a 'PLMN ID' IE, and/or the like.

The new base station 5-2 saves the CAG information associated with the UE 3 in corresponding UE context (step S5) and performs CAG verification (i.e. verifies whether the UE 3 is authorised to use the NPN associated with the CAG to which the new cell 6C belongs). If the information obtained from the core network 7/AMF 9 indicates that the UE 3 belongs to a CAG that matches the CAG associated with the cell 6C, then the UE 3 is allowed to access that NPN and the base station 5-2 and UE 3 complete the RRC resumption procedure. Following successful CAG verification and resuming the RRC connection, the UE 3 is able to transmit data towards the core network 7 via the CAG cell 6C. If the information obtained from the core network 7/AMF 9 indicates that the UE 3 does not belong to any CAG that matches the CAG (or at least one of the CAGs, if more than one) associated with the cell 6C, then the UE 3 access to that cell 6C is rejected (i.e. the UE 3 is unable to resume its RRC connection via that cell 6C, although it may still attempt to resume the RRC connection via another cell).

Modifications and Alternatives

Detailed embodiments have been described above. As those skilled in the art will appreciate, a number of modifications and alternatives can be made to the above embodiments whilst still benefiting from the disclosure embodied therein. By way of illustration only a number of these alternatives and modifications will now be described.

It will be appreciated that the above embodiments may be applied to both 5G New Radio and LTE systems (E-UTRAN).

In the above description, the UE, the access network node (base station), and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the access network node (base station), and the core network node as a signal over a computer network, or on a recording medium. Further, the functionality performed by part or all of this software may be performed using one or more dedicated hardware circuits. However, the use of software modules is preferred as it facilitates the updating of the UE, the access network node, and the core network node in order to update their functionalities.

The above embodiments are also applicable to 'non-mobile' or generally stationary user equipment.

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to 'internet of things' (IoT), using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

| Service Area | MTC applications |
| --- | --- |
| Security | Surveillance systems |
| | Backup for landline |
| | Control of physical access |
| | (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/ |
| | steering |
| Payment | Point of sales |
| | Vending machines |
| | Gaming machines |
| Health | Monitoring vital signs |
| | Supporting the aged or |
| | handicapped |
| | Wed Access Telemedicine |
| | points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |

-continued

| Service Area | MTC applications |
|---|---|
| Consumer Devices | Digital photo frame Digital camera eBook |

Applications, services, and solutions may be an Mobile Virtual Network Operator (MVNO) service, an emergency radio communication system, a Private Branch eXchange (PBX) system, a PHS/Digital Cordless Telecommunications system, a Point of sale (POS) system, an advertise calling system, a Multimedia Broadcast and Multicast Service (MBMS), a Vehicle to Everything (V2X) system, a train radio system, a location related service, a Disaster/Emergency Wireless Communication Service, a community service, a video streaming service, a femto cell application service, a Voice over LTE (VoLTE) service, a charging service, a radio on demand service, a roaming service, an activity monitoring service, a telecom carrier/communication NW selection service, a functional restriction service, a Proof of Concept (PoC) service, a personal information management service, an ad-hoc network/Delay Tolerant Networking (DTN) service, etc.

Further, the above-described UE categories are merely examples of applications of the technical ideas and exemplary embodiments described in the present document. Needless to say, these technical ideas and embodiments are not limited to the above-described UE and various modifications can be made thereto.

The information identifying at least one non-public network may comprise information identifying at least one of a respective Public Land Mobile Network (PLMN) and a respective Closed Access Group (CAG) associated with at least one non-public network. The information identifying a respective PLMN may comprise a PLMN ID, and the information identifying a respective CAG may comprise a CAG ID.

The method performed by the base station may further comprise retrieving said UE context from another base station wherein the information identifying at least one non-public network that UE is authorised to access may be obtained from retrieved UE context.

The information identifying at least one non-public network that UE is authorised to access may be obtained from a core network function (e.g. when UE first accesses non-public network cell or another non-public network cell). In this case, the method may further comprise: transmitting, to core network function, at least one signalling message (e.g. a 'UE Initial message' or a 'UE Context modification indication' message) comprising information identifying the non-public network to which cell belongs; and receiving a response from core network function comprising at least one of: information identifying at least one non-public network that UE is authorised to access; and information identifying that UE is authorised to access the non-public network to which cell belongs.

The method performed by the base station may further comprise transmitting, to a target base station, information identifying that UE is authorised to access that non-public network to which that cell belongs (e.g. as part of UE context).

The core network function may comprise an Access and Mobility Function (AMF).

Various other modifications will be apparent to those skilled in the art and will not be described in further detail here.

Part of or all the foregoing embodiments can be described as in the following appendixes, but the present disclosure is not limited thereto.

(Supplementary Note 1)

A method performed by a base station, the method comprising:
   performing a Radio Resource Control (RRC) setup or RRC resume procedure for a user equipment (UE) in a cell of a non-public network;
   obtaining i) information identifying whether or not UE is authorised to access cell of a non-public network or ii) information identifying at least one non-public network that UE is authorised to access;
   verifying, based on obtained information, whether UE is authorised to access that non-public network; and
   storing, in a UE context for UE, information identifying that UE is authorised to access that non-public network to which that cell belongs depending on a result of verification.

(Supplementary Note 2)

The method according to Supplementary Note 1, wherein information identifying at least one non-public network comprises information identifying at least one of a respective Public Land Mobile Network (PLMN) and a respective Closed Access Group (CAG) associated with at least one non-public network.

(Supplementary Note 3)

The method according to Supplementary Note 1 or 2, wherein information identifying a respective PLMN comprises a PLMN ID, and information identifying a respective CAG comprises a CAG ID.

(Supplementary Note 4)

The method according to any of Supplementary Notes 1 to 3, further comprising retrieving UE context from another base station and wherein said information identifying at least one non-public network that UE is authorised to access is obtained from retrieved UE context.

(Supplementary Note 5)

The method according to any of Supplementary Notes 1 to 4, wherein said information identifying at least one non-public network that UE is authorised to access is obtained from a core network function (e.g. when UE first accesses non-public network cell or another non-public network cell).

(Supplementary Note 6)

The method according to Supplementary Note 5, further comprising: transmitting, to core network function, a signalling message (e.g. a 'UE Initial message' or a 'UE Context modification indication' message) comprising information identifying the non-public network to which cell belongs; and receiving a response from core network function comprising at least one of: information identifying at least one non-public network that UE is authorised to access; and information identifying that UE is authorised to access the non-public network to which cell belongs.

(Supplementary Note 7)

The method according to any of Supplementary Notes 1 to 6, further comprising transmitting, to a target base station, information identifying that UE is authorised to access that non-public network to which that cell belongs (e.g. as part of UE context).

(Supplementary Note 8)

A method performed by a core network function, the method comprising: receiving, from a base station, a signalling message including information identifying a non-public network that a user equipment (UE) is attempting to access;

verifying, based on received information and based on membership/subscription information associated with UE, whether UE is authorised to access that non-public network; and providing a result of verification to base station for storing, by said base station in a UE context for UE, information identifying whether UE is authorised to access that non-public network.

(Supplementary Note 9)

The method according to Supplementary Note 8, wherein information identifying a non-public network comprises information identifying a Public Land Mobile Network (PLMN) and a Closed Access Group (CAG) associated with said non-public network.

(Supplementary Note 10)

A method performed by a core network function, the method comprising:

providing, to a base station, information identifying at least one non-public network that a user equipment (UE) is a member of, for use by base station in verifying whether UE is authorised to access a non-public network associated with that base station or another base station.

(Supplementary Note 11)

The method according to Supplementary Note 10, wherein information identifying at least one non-public network that a UE is a member of comprises information identifying at least one of a respective Public Land Mobile Network (PLMN) and a respective Closed Access Group (CAG) associated with at least one non-public network.

(Supplementary Note 12)

The method according to Supplementary Note 10 or 11, wherein providing comprises transmitting, to base station, an 'Initial Context Setup Request' or a 'UE Context Modification Indication' message comprising information identifying at least one non-public network that the UE is a member of.

(Supplementary Note 13)

The method according to any of Supplementary Notes 10 to 12, wherein said information identifying at least one non-public network that the UE is a member of comprises one or more information element listing at least one CAG identifier or PLMN identifier associated with the UE.

(Supplementary Note 14)

The method according to any of Supplementary Notes 8 to 13, wherein said core network function comprises an Access and Mobility Function (AMF).

(Supplementary Note 15)

A base station comprising a controller and a transceiver, wherein the controller is configured to:

perform a Radio Resource Control (RRC) setup or RRC resume procedure for a user equipment (UE) in a cell of a non-public network;

obtain i) information identifying whether or not UE is authorised to access cell of a non-public network or ii) information identifying at least one non-public network that UE is authorised to access;

verify, based on obtained information, whether UE is authorised to access that non-public network; and store, in a UE context for UE, information identifying that UE is authorised to access that non-public network to which that cell belongs depending on a result of verification.

(Supplementary Note 16)

A core network function comprising a controller and a transceiver, wherein the controller is configured to:

receive, from a base station, a signalling message including information identifying a non-public network that a user equipment (UE) is attempting to access;

verify, based on received information and based on membership/subscription information associated with UE, whether UE is authorised to access that non-public network; and provide a result of verification to base station for storing, by said base station in a UE context for UE, information identifying whether UE is authorised to access that non-public network.

(Supplementary Note 17)

A core network function comprising a controller and a transceiver, wherein the controller is configured to:

provide, to a base station, information identifying at least one non-public network that a user equipment (UE) is a member of, for use by base station in verifying whether UE is authorised to access a non-public network associated with that base station or another base station.

It will be appreciated by a person skilled in the art that numerous variations and/or modifications may be made to the present disclosure as shown in the specific embodiments without departing from the spirit or scope of this disclosure as broadly described. The present embodiments are, therefore, to be considered in all respects to be illustrative and not restrictive.

This application is based upon and claims the benefit of priority from United Kingdom patent application No. 1914403.9, filed on Oct. 4, 2019, the disclosure of which is incorporated herein in its entirety by reference.

REFERENCE SIGNS LIST 1 mobile telecommunication system
3 mobile device (UE)
5 base station
6P public cell
6C Closed Access Group (CAG) cell
7 core network
9 Access and Mobility Function (AMF)
10 Data Network (DN)
31 transceiver circuit
33 antenna
35 user interface
37 controller
39 memory
41 operating system
43 communications control module
44 RNA module
51 transceiver circuit
53 antenna
55 network interface
57 controller
59 memory
61 operating system
63 communications control module
65 CAG verification module
71 transceiver circuit
75 network interface
77 controller 79 memory
81 operating system
83 communications control module
85 CAG verification module

What is claimed is:

1. A method performed by a base station, the method comprising:
performing a Radio Resource Control (RRC) resume procedure for a user equipment (UE) in a cell of a non-public network;
receiving, from another base station, first information including information indicating at least one non-public network which the UE is allowed to access and information indicating at least one closed access group (CAG) corresponding to each of the at least one non-public network;
rejecting a procedure for the UE to access one of the at least one non-public network, in a case where a CAG indicated by the first information is not included in CAGs which the base station supports,
wherein the first information is stored in a UE context for the UE in the another base station in a procedure of a RRC setup for the UE in another cell of a network.

2. The method according to claim 1, wherein the information indicating the at least one non-public network includes information indicating at least one of:
a respective Public Land Mobile Network (PLMN); or
a respective Closed Access Group (CAG) corresponding to the at least one non-public network.

3. The method according to claim 2, wherein the information indicating the respective PLMN includes a PLMN ID, and
wherein the information indicating the respective CAG includes a CAG ID.

4. The method according to claim 1, wherein the information indicating the at least one non-public network is received from a core network node.

5. A method performed by a core network node, the method comprising:
receiving, from a base station, a signaling message including information indicating a non-public network that a user equipment (UE) is attempting to access;
verifying, based on the information and based on membership/subscription information corresponding to the UE, whether the UE is allowed to access the non-public network; and
transmitting, to the base station, first information including information indicating at least one non-public network which the UE is allowed to access and information indicating at least one closed access group (CAG) corresponding to each of the at least one non-public network, for the base station to store the information in a UE context for the UE,
wherein the first information is transmitted from the base station to another base station to reject a procedure for the UE to access one of the at least one non-public network, in a case where a CAG indicated by the first information is not included in CAGs which the base station supports, when the UE performs a Radio Resource Control (RRC) resume procedure with the another base station.

6. The method according to claim 5, wherein the information indicating the at least one non-public network includes information indicating at least one of:
a respective Public Land Mobile Network (PLMN); or
a respective Closed Access Group (CAG) corresponding to the at least one non-public network.

7. A method performed by a core network node, the method comprising:
transmitting, to a base station, first information including information indicating at least one non-public network which a user equipment (UE) is allowed to access and information indicating at least one closed access group (CAG) corresponding to each of the at least one non-public network, for use by the base station in verifying whether the UE is allowed to access a non-public network corresponding to the base station or another base station,
wherein the first information is transmitted from the base station to another base station to reject a procedure for the UE to access one of the at least one non-public network, in a case where a CAG indicated by the first information is not included in CAGs which the base station supports, when the UE performs a Radio Resource Control (RRC) resume procedure with the another base station.

8. The method according to claim 7, wherein the information indicating the at least one non-public network includes information indicating at least one of:
a respective Public Land Mobile Network (PLMN); or
a respective Closed Access Group (CAG) corresponding to the at least one non-public network.

9. The method according to claim 7, wherein the transmitting includes transmitting, to the base station, an Initial Context Setup Request message or a UE Context Modification Indication message including the first information.

10. A base station comprising:
at least one memory storing instructions; and
at least one processor configured to process the instructions to:
perform a Radio Resource Control (RRC) resume procedure for a user equipment (UE) in a cell of a non-public network;
receive, from another base station, first information including information indicating at least one non-public network which the UE is allowed to access and information indicating at least one closed access group (CAG) corresponding to each of the at least one non-public network;
reject a procedure for the UE to access one of the at least one non-public network, in a case where a CAG indicated by the first information is not included in CAGs which the base station supports,
wherein the first information is stored in a UE context for the UE in the another base station in a procedure of a RRC setup for the UE in another cell of a network.

11. A core network node comprising:
at least one memory storing instructions; and
at least one processor configured to process the instructions to:
receive, from a base station, a signaling message including information indicating a non-public network that a user equipment (UE) is attempting to access;
verify, based on the information and based on membership/subscription information corresponding to the UE, whether the UE is allowed to access the non-public network; and
transmit, to the base station, first information including information indicating at least one non-public network which the UE is allowed to access and information indicating at least one closed access group (CAG) corresponding to each of the at least one non-public network, for the base station to store the information in a UE context for the UE, wherein the first information is transmitted from the base station to another base station to reject a procedure for the UE to access one of the at least one non-public network, in a case where a CAG indicated by the first information is not included in CAGs which the base station supports, when the UE performs a Radio Resource Control (RRC) resume procedure with the another base station.

12. A core network node comprising:

at least one memory storing instructions; and at least one processor configured to process the instructions to:

transmit, to a base station, first information including information indicating at least one non-public network which a user equipment (UE) is allowed to access and information indicating at least one closed access group (CAG) corresponding to each of the at least one non-public network, for use by the base station in verifying whether the UE is allowed to access a non-public network corresponding to the base station or another base station, wherein the first information is transmitted from the base station to another base station to reject a procedure for the UE to access one of the at least one non-public network, in a case where a CAG indicated by the first information is not included in CAGs which the base station supports, when the UE performs a Radio Resource Control (RRC) resume procedure with the another base station.

* * * * *